US011797041B1

(12) United States Patent
Newlin

(10) Patent No.: US 11,797,041 B1
(45) Date of Patent: Oct. 24, 2023

(54) POWER MANAGEMENT CIRCUIT

(71) Applicant: NXP USA, Inc., Austin, TX (US)

(72) Inventor: Trevor Mark Newlin, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/658,568

(22) Filed: Apr. 8, 2022

(51) Int. Cl.
*G05F 3/30* (2006.01)
*G05F 1/46* (2006.01)
*G05F 1/565* (2006.01)
*H02H 3/24* (2006.01)
*G05F 3/16* (2006.01)

(52) U.S. Cl.
CPC ............... *G05F 3/30* (2013.01); *G05F 1/468* (2013.01); *G05F 1/565* (2013.01); *G05F 3/16* (2013.01); *H02H 3/24* (2013.01)

(58) Field of Classification Search
CPC .......... G05F 1/462; G05F 1/465; G05F 1/468; G05F 1/565; G05F 1/569; G05F 1/575; G05F 3/16; G05F 3/20; G05F 3/22–223; G05F 3/26–30; H02M 1/32; H02M 1/36; H02H 3/006; H02H 3/207; H02H 3/24; H02H 3/243; H02H 3/247; H02H 7/1203; H02H 7/1213; H02H 7/20; H02H 7/205
See application file for complete search history.

(56) References Cited

U.S. PATENT DOCUMENTS

| | | | | |
|---|---|---|---|---|
| 6,844,711 B1* | 1/2005 | Sutardja | .................... | G05F 3/30 323/314 |
| 7,859,918 B1* | 12/2010 | Nguyen | .................. | G05F 3/242 365/210.1 |
| 8,723,554 B2 | 5/2014 | Zanchi | | |
| 9,190,988 B1* | 11/2015 | Gupta | ..................... | H03K 3/012 |
| 9,342,084 B1* | 5/2016 | Konecny | .................. | H03K 5/24 |
| 2007/0014176 A1* | 1/2007 | Krenzke | ............... | G11C 16/30 365/189.09 |
| 2010/0156519 A1* | 6/2010 | Cremonesi | ............... | G05F 1/46 327/539 |
| 2011/0296221 A1* | 12/2011 | Gupta | .................. | G06F 1/3203 327/539 |
| 2012/0051157 A1* | 3/2012 | Nakanishi | ............. | G11C 5/147 365/189.09 |
| 2014/0107857 A1* | 4/2014 | Yang | ......................... | G06F 1/26 700/298 |
| 2015/0102856 A1* | 4/2015 | Barrett, Jr. | ............... | G05F 3/30 327/539 |
| 2018/0074532 A1* | 3/2018 | Mandal | .................... | G05F 3/30 |
| 2018/0224873 A1* | 8/2018 | Motz | ......................... | G01K 7/01 |
| 2020/0387183 A1* | 12/2020 | Hermann | ................ | G05F 1/468 |
| 2020/0401177 A1* | 12/2020 | Liang | ..................... | G05F 1/595 |

(Continued)

OTHER PUBLICATIONS

Wikipedia; "Undervoltage-lockout"; retrieved from the Internet https://en.wikipedia.org/wiki/Undervoltage-lockout; 1 page; (Apr. 8, 2022).

(Continued)

*Primary Examiner* — Fred E Finch, III

(57) ABSTRACT

One example discloses a power management circuit, including: a voltage reference circuit including a bandgap circuit coupled to and configured by a first trimming circuit; an undervoltage lockout (UVLO) circuit coupled to and configured by a second trimming circuit; wherein the first trimming circuit and the second trimming circuit are configured to receive a single trim control setting.

13 Claims, 3 Drawing Sheets

(56) References Cited

U.S. PATENT DOCUMENTS

2021/0191437 A1\* 6/2021 Grave .................... G05F 1/565
2021/0255651 A1\* 8/2021 Motz ................ G01R 19/16538

OTHER PUBLICATIONS

Wikipedia; "Bandgap voltage reference"; retrieved from the Internet https://en.wikipedia.org/wiki/Bandgap_voltage_reference ; 4 pages (Apr. 8, 2022).

Wikipedia; "Brokaw bandgap reference"; retrieved from the Internet https://en.wikipedia.org/wiki/Brokaw_bandgap_reference ; 2 pages (Apr. 8, 2022).

Johnson, Dexter; "Printing Circuits on Nanomagnets Yields a New Breed of AI LANL researchers have fabricated AI algorithms out of physical hardware—pioneering a new form of analog computing"; retrieved from the Internet https://spectrum.ieee.org/spin-glass-nanomagnet-ai; 13 pages (Apr. 6, 2022).

\* cited by examiner

POWER MANAGEMENT CIRCUIT

The present specification relates to systems, methods, apparatuses, devices, articles of manufacture and instructions for power management circuits including bandgap voltage reference and undervoltage lock out (UVLO) circuits.

SUMMARY

According to an example embodiment, a power management circuit, comprising: a voltage reference circuit including a bandgap circuit coupled to and configured by a first trimming circuit; an undervoltage lockout (UVLO) circuit coupled to and configured by a second trimming circuit; wherein the first trimming circuit and the second trimming circuit are configured to receive a single trim control setting.

In another example embodiment, the bandgap circuit is a first bandgap circuit; and the UVLO circuit includes a second bandgap circuit coupled to and configured by the second trim circuit.

In another example embodiment, the first and second bandgap circuits are topologically identical.

In another example embodiment, the first and second bandgap circuits are electrically equivalent.

In another example embodiment, the first and second bandgap circuits have a Brokaw topology.

In another example embodiment, the voltage reference circuit is configured to output a reference voltage to a voltage regulator.

In another example embodiment, the UVLO circuit is configured to receive a regulated voltage signal from a voltage regulator.

In another example embodiment, the UVLO circuit is configured to output a UVLO status to a load circuit.

In another example embodiment, the UVLO status is set, to a first state if the regulated voltage signal is above a predetermined minimum voltage, and to a second state if the regulated voltage signal is below the predetermined minimum voltage.

In another example embodiment, the predetermined minimum voltage is a minimum operational voltage of the load circuit.

In another example embodiment, the voltage reference circuit includes an amplifier; and the UVLO circuit includes a comparator.

In another example embodiment, the single trim control setting is a same trim control setting.

In another example embodiment, the trim control setting is a digital trim code.

In another example embodiment, the trim control setting is not adjustable.

In another example embodiment, the trim control setting is selected in response to a manufacturing test.

In another example embodiment, the bandgap circuit is a first bandgap circuit; the reference voltage is a first reference voltage configured to be sent to a first voltage regulator; the voltage regulator circuit further includes a second bandgap circuit configured to send a second reference voltage to a second voltage regulator; and the second bandgap circuit includes a third trimming circuit configured to receive the trim control setting.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
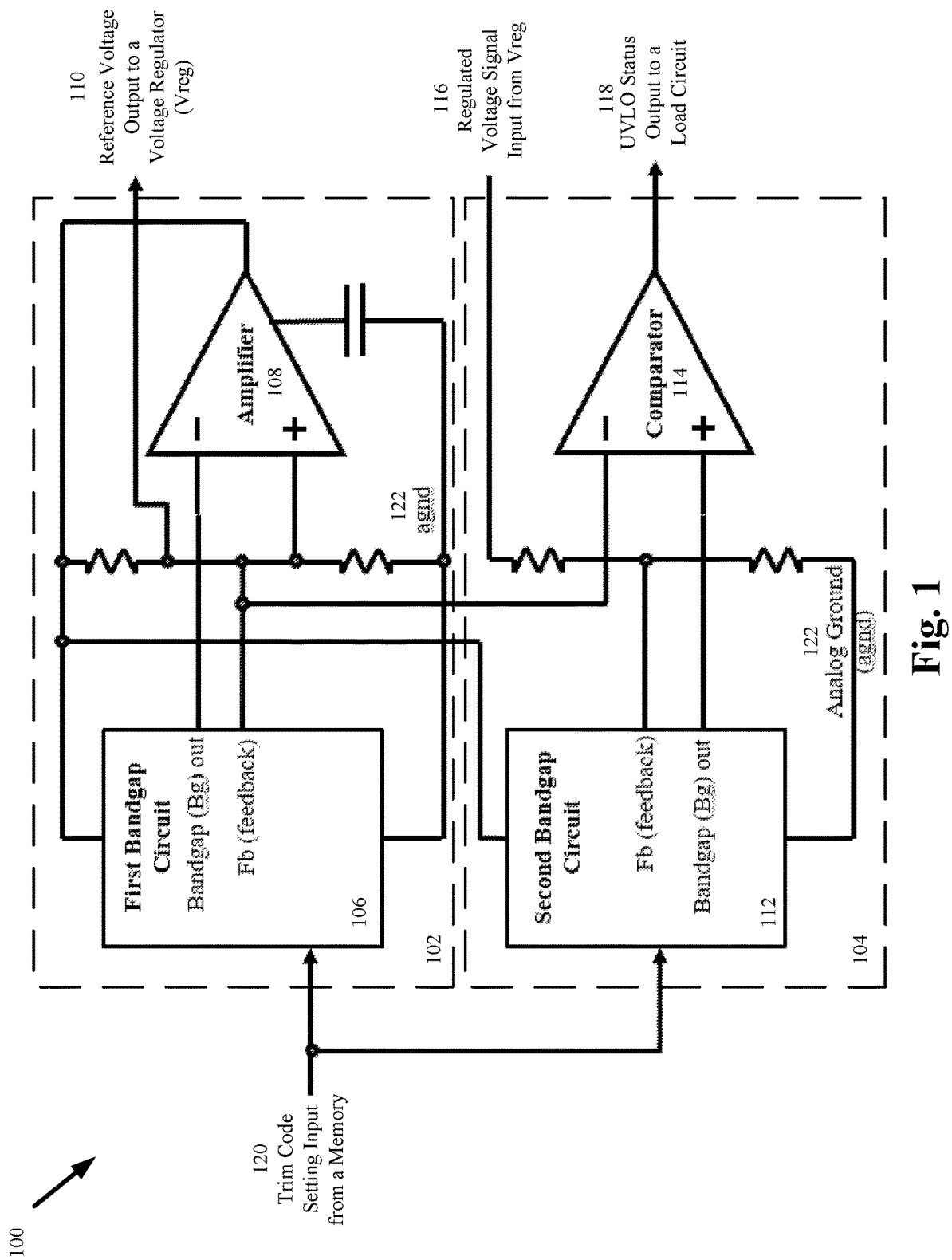
FIG. 1 represents a first example power management circuit.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Systems, devices, integrated circuits, etc. need stable predictable power supplies to function reliably and safely. Voltage regulators (Vreg) need to output predictable power using often unpredictable power inputs.

To help stabilize Vreg output voltage, a bandgap voltage reference is often used. A bandgap voltage reference is a temperature independent voltage reference circuit that produces a fixed (constant) voltage regardless of power supply variations, temperature changes, or circuit loading from a device. In many example applications, the bandgap voltage reference has an output voltage of about 1.25 V.

One type of bandgap reference circuit is a Brokaw bandgap reference. A Brokaw bandgap reference has an output voltage around 1.25 V with low temperature dependence.

An undervoltage-lockout (UVLO) circuit is an electronic circuit used to turn off the power of an electronic device in the event of a monitored voltage dropping below a predetermined operational value.

For instance, in embedded devices, UVLOs can be used to monitor a charge state of a battery (consumer device, automotive, industrial, etc.). Either the UVLO or another circuit can then respond by charging the battery, turning off a load circuit, etc. if the monitored voltage drops below a predetermined threshold.

In power management circuits, bandgap voltage reference circuits and UVLO circuits have been separately and independently designed, optimized, laid-out, and then combined to provide their functionality.

Now discussed are example embodiments of power management circuits having a more integrated bandgap voltage reference circuit and UVLO circuit design, such as by sharing their trim code settings. The example embodiments discussed enable higher UVLO thresholds to be set. For example, having to design analog cells to work down to 1.35V in a 1.6V process can cause significant extra design complexity and area overhead. However, circuits that can increase the minimum power management circuit operating voltage to 1.45V or higher can significantly simplify the power management circuit's design, potentially reducing a total silicon area, running current and design time.

FIG. 1 represents a first example power management circuit 100. The circuit 100 includes a voltage reference circuit 102 and an undervoltage lockout (UVLO) circuit 104.

The voltage reference circuit 102 includes a first bandgap circuit 106 and an amplifier 108. The voltage reference circuit 102 generates a reference voltage 110 that is output to a voltage regulator (Vreg) (not shown).

The undervoltage lockout (UVLO) circuit 104 includes a second bandgap circuit 112 and a comparator 114. The UVLO 104 is configured to receive a regulated voltage signal 116 from the voltage regulator (Vreg) and in response generate a UVLO status 118 sent to a load circuit (not shown).

The load circuit uses the UVLO status 118 to determine if the voltage regulator is supplying enough power to the load for the load to reliably operate. Depending upon the application, the UVLO status 118 can be a binary signal set to either "voltage nominal" (e.g. load circuit can reliably operate) or "voltage below nominal" (e.g. load circuit can not reliably operate).

Both bandgap circuits 106, 112 receive a same trim code setting 120 retrieved from a memory (not shown) and are coupled to a common ground 122 (agnd). In some example embodiments the bandgap circuits 106, 112 are also coupled to a same temperature coefficient (TC) adjustment DAC.

Since a same trim code is used for both bandgap circuits 106, 112, the UVLO circuit 104 will be properly triggered and much closer thresholds for the target supply voltage of primary interest for the circuit performance can be set. The trim code setting 120 is varied (i.e. "trimmed down") during final chip testing during manufacture then set to an optimal fixed value that is often blocked from further adjustment before shipment to a customer.

When setting this trim code 120, it is important to note that during power-up/wake-up (i.e. "pre-trim") of the power management circuit 100, the trim code 120 will not have been yet read from memory since a power supply including the power management circuit 100 is still powering up. During this "pre-trim" state the power management circuit 100 must still work even before proper trimming. The power management circuit 100 is designed to wake up under worst possible condition.

During power supply shutdown (i.e. "post-trim"), the trim code 120 must also assure that the power management circuit's 100 UVLO 104 can set the UVLO status 118 to a state warning the load circuit to prepare for lock out/graceful shutdown.

In some example embodiments, the trim code 120 is set to a maximum value. Setting the trim code 120 to a maximum value ensures that a minimum voltage reference voltage (vbg), for example, will be greater than 1.45V for a 1.6V design.

In many example embodiments the bandgap circuits 106, 112 are either topologically identical or electrically equivalent. Topologically identical is herein defined as having a same fabrication mask layout, and electrically equivalent is herein defined as generating a same reference voltage (Bg out) in response to a same received trim code setting 120 from the memory.

In some example embodiments the bandgap circuits 106, 112 have a Brokaw topology (i.e. fabrication layout). Brokaw circuits/cells have an innately low input offset leading to lower temperature coefficients in production, and have gain thereby reducing any effect of output stage differences.

Figure 2:
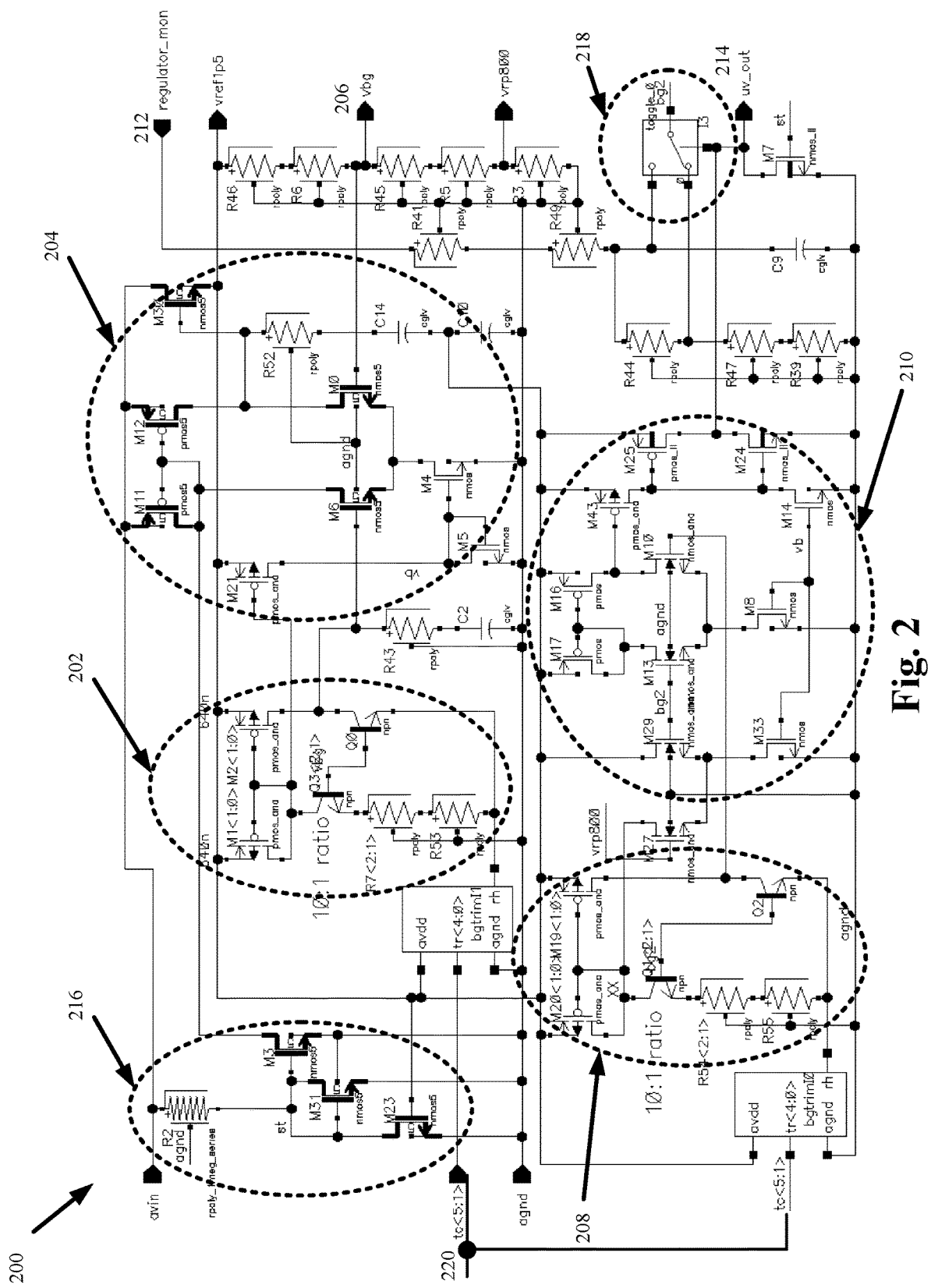
FIG. 2 represents a second example power management circuit.

FIG. 2 represents a second example power management circuit 200. The second circuit 200 includes a voltage reference circuit and an undervoltage lockout (UVLO) circuit, similar to that discussed in FIG. 1. The voltage reference circuit includes a first bandgap circuit 202 and an amplifier 204, and is configured to generate and output a reference voltage 206 (vbg) to a voltage regulator (Vreg).

The undervoltage lockout (UVLO) circuit includes a second bandgap circuit 208 and a comparator 210, and is configured to receive a regulated voltage signal 212 (regulator_mon, input from the voltage regulator (Vreg) and generate and output a UVLO status output 214 (uv_out) to a load circuit.

The second circuit 200 also includes a start-up circuit 216 and a hysteresis circuit 218. A same start-up circuit 216 is used for both the voltage reference circuit and the undervoltage lockout (UVLO) circuit thereby saving space and ensuring the same threshold modulation.

Both bandgap circuits 202, 208 are either topologically identical, or electrically equivalent, as discussed above. The both also receive a same trim control setting 220 (tc<5:1>).

The majority of bandgap voltage reference error, that is not reducible, is the VBE (bi-polar transistor base to emitter voltage) that is controlled by the transistor's fabrication process. The bipolar match is very good. The primary error between the bandgap circuits/cells is the Mirror offset which is controlled by the PCH transistor's size. Feedback resistors are sizeable to produce minimal error in both cases.

By ensuring that the two bandgap circuits/cores 202, 208 are substantially identical, the trim control setting 220 can be adjusted to yield a reference voltage 206 (vbg) (e.g. 1.45V) that is closer to a desired output voltage reference voltage (e.g. 1.6V).

Load regulation will ultimately set a maximum reference voltage 206 (vbg) for the UVLO status output 214 sent to the load to be set to a "power-nominal" status. In a practical system accounting for offset and resistor matching the maximum UVLO voltage is close to 3% or 33% of the original system setting.

Figure 3:
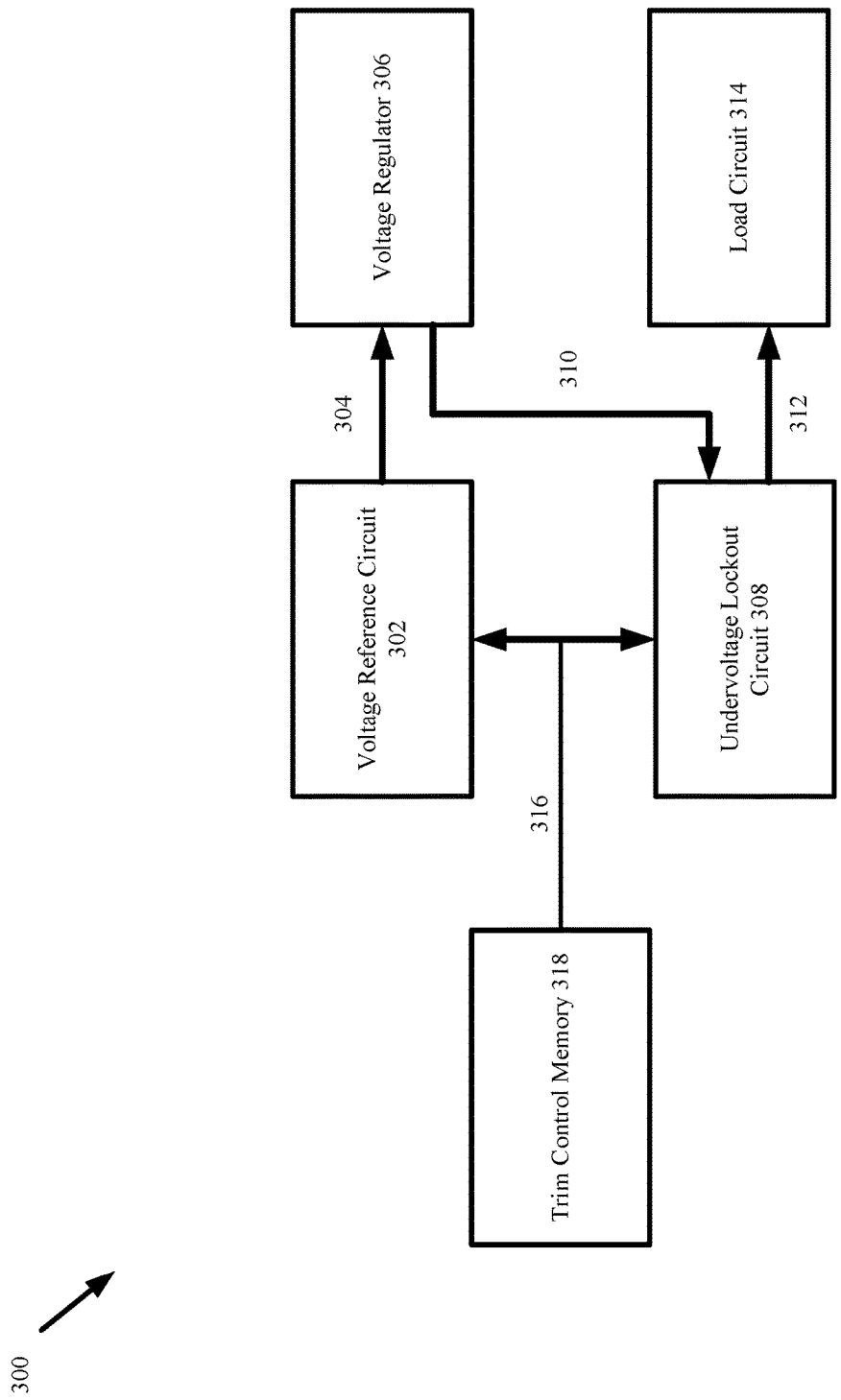
FIG. 3 represents an example apparatus including a power management circuit.

FIG. 3 represents an example apparatus 300 including a power management circuit. The example apparatus 300 includes a voltage reference circuit 302 and a undervoltage lockout (UVLO) circuit 308.

The voltage reference circuit 302 is configured to generate a reference voltage 304 sent to a voltage regulator (Vreg)) 306.

The undervoltage lockout (UVLO) circuit 308 is configured to receive a regulated voltage signal 310 from the voltage regulator (Vreg)) 306 and in response generate and send a UVLO status output 312 to a load circuit 314.

Both the voltage reference circuit 302 and a undervoltage lockout (UVLO) circuit 308 receive a trim control setting 316 from a trim control memory 318.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A power management circuit, comprising:
    a voltage reference circuit including a first bandgap circuit coupled to and configured by a first trimming circuit;
    an undervoltage lockout (UVLO) circuit including a second bandgap circuit coupled to and configured by a second trimming circuit;
    wherein the first trimming circuit and the second trimming circuit are configured to receive and share a same common trim control setting.

2. The circuit of claim 1:
    wherein the first and second bandgap circuits are topologically identical.

3. The circuit of claim 1:
    wherein the first and second bandgap circuits are electrically equivalent.

4. The circuit of claim 1:
    wherein the first and second bandgap circuits have a Brokaw topology.

5. The circuit of claim 1:
    wherein the voltage reference circuit is configured to output a reference voltage to a voltage regulator.

6. The circuit of claim 1:
    wherein the UVLO circuit is configured to receive a regulated voltage signal from a voltage regulator.

7. The circuit of claim 1:
    wherein the UVLO circuit is configured to output a UVLO status to a load circuit.

8. The circuit of claim 7:
    wherein the UVLO status is set,
        to a first state if the regulated voltage signal is above a predetermined minimum voltage, and
        to a second state if the regulated voltage signal is below the predetermined minimum voltage.

9. The circuit of claim 8:
    wherein the predetermined minimum voltage is a minimum operational voltage of the load circuit.

10. The circuit of claim 1:
    wherein the voltage reference circuit includes an amplifier; and
    wherein the UVLO circuit includes a comparator.

11. The circuit of claim 1:
    wherein the trim control setting is a digital trim code.

12. The circuit of claim 1:
    wherein the trim control setting is not adjustable.

13. The circuit of claim 1:
    wherein the trim control setting is selected in response to a manufacturing test.

* * * * *